(12) United States Patent
Shakib et al.

(10) Patent No.: US 7,502,773 B1
(45) Date of Patent: Mar. 10, 2009

(54) SYSTEM AND METHOD FACILITATING PAGE INDEXING EMPLOYING REFERENCE INFORMATION

(75) Inventors: Darren A. Shakib, North Bend, WA (US); Keith A. Birney, Redmond, WA (US)

(73) Assignee: Microsoft Corporation, Redmond, CA (US)

( * ) Notice: Subject to any disclaimer, the term of this patent is extended or adjusted under 35 U.S.C. 154(b) by 249 days.

(21) Appl. No.: 10/749,985

(22) Filed: Dec. 31, 2003

(51) Int. Cl.
G06F 17/30 (2006.01)
(52) U.S. Cl. .......................... 707/2; 707/200; 715/208; 715/234
(58) Field of Classification Search ................ 707/1–3, 707/10, 102, 104.1, 2, 200, 202; 709/201; 715/205, 208, 234
See application file for complete search history.

(56) References Cited

U.S. PATENT DOCUMENTS

| | | | | |
|---|---|---|---|---|
| 5,920,859 A * | 7/1999 | Li | ................................ | 707/5 |
| 6,285,999 B1 * | 9/2001 | Page | ............................ | 707/5 |
| 6,317,885 B1 | 11/2001 | Fries | .......................... | 725/109 |
| 6,526,440 B1 | 2/2003 | Bharat | ...................... | 709/219 |
| 6,529,903 B2 | 3/2003 | Smith et al. | .................... | 707/7 |
| 6,615,209 B1 | 9/2003 | Gomes et al. | .................. | 707/5 |
| 6,658,423 B1 | 12/2003 | Pugh et al. | .................. | 707/102 |
| 6,678,681 B1 | 1/2004 | Brin | ............................. | 707/6 |
| 2002/0123988 A1 | 9/2002 | Dean et al. | ..................... | 707/3 |
| 2002/0129014 A1 * | 9/2002 | Kim et al. | ...................... | 707/5 |
| 2002/0133481 A1 | 9/2002 | Smith et al. | ................... | 707/13 |
| 2003/0208482 A1 * | 11/2003 | Kim et al. | ...................... | 707/3 |
| 2005/0138007 A1 * | 6/2005 | Amitay | ........................ | 707/3 |

OTHER PUBLICATIONS

Amit Singhal et al., AT&T at Trec-9, AT&T Labs-Research, 2001, pp. 1-3.
Brian D. Davison., Topical Locality in the Web, Rutgers University, 2000, pp. 1-8.
Yoshiaki Mizuuchi et al., Finding Context Paths for Web Pages, Kobe University, 1999, pp. 1-9.
Evangelos P. Markatos.,On Caching Search Engine Results, Institute of Computer Science, Foundation for Research & Technology- Hellas(FORTH), 1999, pp. 1-14, Heraklio, Crete, Greece.
Sergey Brin et al., The Anatomy of a Large-Scale Hypertextual Web Search Engine, Stanford University, 1998, pp. 1-18.

* cited by examiner

*Primary Examiner*—Cheryl Lewis
(74) *Attorney, Agent, or Firm*—Amin, Turocy & Calvin, LLP

(57) ABSTRACT

A system and method facilitating page indexing employing reference information (e.g., anchor text) is provided. In accordance with an aspect of the present invention, a page index system having a page data store and a crawler component is provided. The page data store stores reference information associated with pages. The crawler component receives a page, retrieves reference information associated with the page from the page data store, and, provides the page and associated reference information, for example, to an index building system. The system can thus facilitate indexing of pages based, at least in part, upon reference information (e.g., anchor text) associated with the pages.

24 Claims, 8 Drawing Sheets

SYSTEM AND METHOD FACILITATING PAGE INDEXING EMPLOYING REFERENCE INFORMATION

TECHNICAL FIELD

The present invention relates generally to page indexing, and, more particularly, to a system and method facilitating page indexing employing reference information (e.g., anchor text).

BACKGROUND OF THE INVENTION

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Typically, the information available via web sites and servers is accessed via a web browser executing on a web client (e.g., a computer). For example, a web user can deploy a web browser and access a web site by entering the web site Uniform Resource Locator (URL) (e.g., a web address and/or an Internet address) into an address bar of the web browser and pressing the enter key on a keyboard or clicking a "go" button with a mouse. The URL typically includes four pieces of information that facilitate access: a protocol (a language for computers to communicate with each other) that indicates a set of rules and standards for the exchange of information, a location to the web site, a name of an organization that maintains the web site, and a suffix (e.g., com, org, net, gov and edu) that identifies the type of organization.

In some instances, the user knows, a priori, the name of the site or server, and/or the URL to the site or server that the user desires to access. In such situations, the user can access the site, as described above, via entering the URL in the address bar and connecting to the site. However, in most instances, the user does not know the URL or the site name. Instead, the user employs a search engine to facilitate locating a site based on keywords provided by the user. In general, the search engine is comprised of executable applications or programs that search the contents of web sites and servers for keywords, and return a list of links to web sites and servers where the keywords are found. Basically, the search engine incorporates a web "crawler" (aka, a "spider" or a "robot") that retrieves as many documents as possible as their associated URL. This information is then stored such that an indexer can manipulate the retrieved data. The indexer reads the documents, and creates a prioritized index based on the keywords contained in each document and other attributes of the document. Respective search engines generally employ a proprietary algorithm to create indices such that meaningful results are returned for a query.

Thus, a web crawler is crucial to the operation of search engines. In order to provide current and up-to-date search results, the crawler must constantly search the web to find new web pages, to update old web page information, and to remove deleted pages. The number of web pages found on the Internet is astronomical. It therefore requires that a web crawler be extremely fast. Since most web crawlers gather their data by polling servers that provide the web pages, a crawler must also be as unobtrusive as possible when accessing a particular server. Otherwise, the crawler can absorb all of the server's resources very quickly and cause the server to shut down. Generally, a crawler identifies itself to a server and seeks permission before accessing a server's web pages. At this point, a server can deny access to an abusive crawler that steals all of the server's resources. A web page hosting server typically benefits from search engines, because they allow users to find their web pages more easily. Thus, most servers welcome crawlers, as long as they do not drain all of the server's resources, so that the server's contents can be better exploited by users.

Anchor text (e.g., word(s), phrase(s), sentence(s) and/or paragraph(s)) preceding and/or following a link can provide descriptive information which can be helpful in determining content of the linked document. Thus, for an Internet search engine to provide the best possible results, it should index not only the words contained within Internet document(s), but also the words contained in the anchor text of link(s) in other document(s) that point to the document.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating page indexing employing reference information (e.g., anchor text). In accordance with an aspect of the present invention, a page index system having a page data store and a crawler component is provided. The page data store stores reference information associated with pages. The crawler component receives a page, retrieves reference information associated with the page from the page data store, and, provides the page and associated reference information, for example, to an index building system. The system can thus facilitate indexing of pages based, at least in part, upon reference information (e.g., anchor text) associated with the pages.

The system can be employed as a part of an Internet search engine that provides better results than conventional search engine(s). The system can facilitate indexing of not only the words contained within Internet page(s) (e.g., document(s)), but also the words contained in the reference information (e.g., anchor text) of links in other page(s) (e.g., document(s)) that point to each document (e.g., referencing page(s)). Thus, in accordance with another aspect of the present invention, anchor text words found in links to a document can be included in the index of words associated with a document with minimal machine cost.

In one example, employing reference information (e.g., anchor text) can mitigate the need to have a separate anchor text server. Additionally, the system facilitates the reference information (e.g., anchor text) of links pointing to a page (e.g., document) to be merged with the page (e.g., at download time), making it easy to include reference information (e.g., anchor text words) in the index for the page (e.g., document).

The system can accumulate reference information (e.g., anchor text) associated with a particular page in the page data store (e.g., URL seen file). When a request for a page is received, the crawler component can fetch the page (e.g., via the Internet). Thereafter, the crawler component can retrieve reference information (e.g., anchor text) associated with the page, if any, from the page data store. The crawler component can then merge the page and at least some of its associated reference information (e.g., anchor text), if any, and provide the merged page and associated reference information (e.g., to an index builder).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
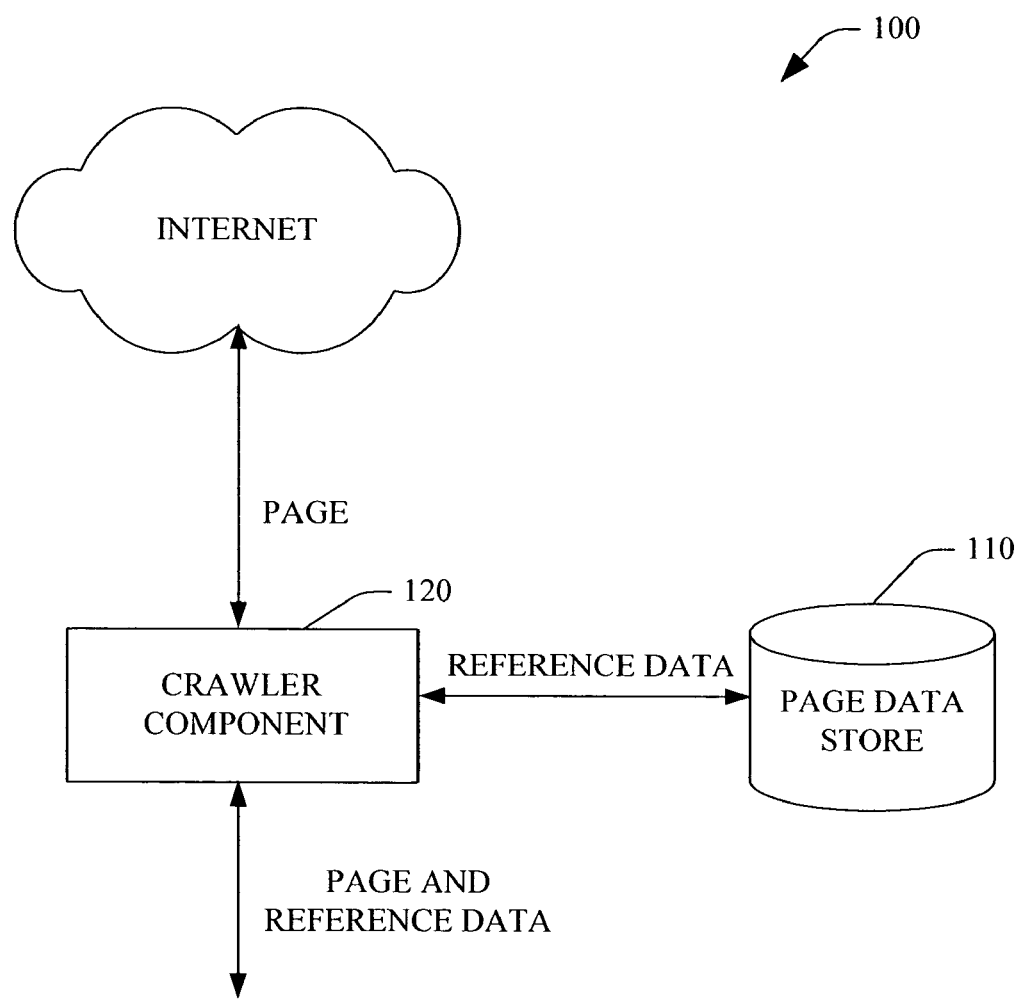
FIG. 1 is a block diagram of a page index system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Referring to FIG. 1, a page index system 100 in accordance with an aspect of the present invention is illustrated. The system 100 includes a page data store 110 and a crawler component 120. The system 100 can facilitate indexing of pages based, at least in part, upon reference information (e.g., anchor text) associated with the pages.

"Reference information" includes information referring to a target page. In one example, reference information includes anchor text. Anchor text can include a better explanation of what is on a target page than what the author of the page describes. In another example, self-referential reference information is not employed by the system 100. Further, "page" is intended to refer to a physical and/or logical entity that can be identified by a uniform resource locator, for example, a document and/or image.

Thus, in accordance with an aspect of the present invention, the system 100 can be employed as a part of an Internet search engine that provides better results than conventional search engine(s). The system 100 facilitates indexing of not only the words contained within Internet page(s) (e.g., document(s)), but also the words contained in the reference information (e.g., anchor text) of links in other page(s) (e.g., document(s)) that point to each document (e.g., referencing page (s)). Thus, in accordance with an aspect of the present invention, anchor text words found in links to a document can be included in the index of words associated with a document with minimal machine cost.

In one example, employing reference information (e.g., anchor text) can mitigate the need to have a separate anchor text server. Additionally, the system 100 facilitates the reference information (e.g., anchor text) of links pointing to a page (e.g., document) to be merged with the page (e.g., at download time), making it easy to include reference information (e.g., anchor text words) in the index for the page (e.g., document).

Figure 2:
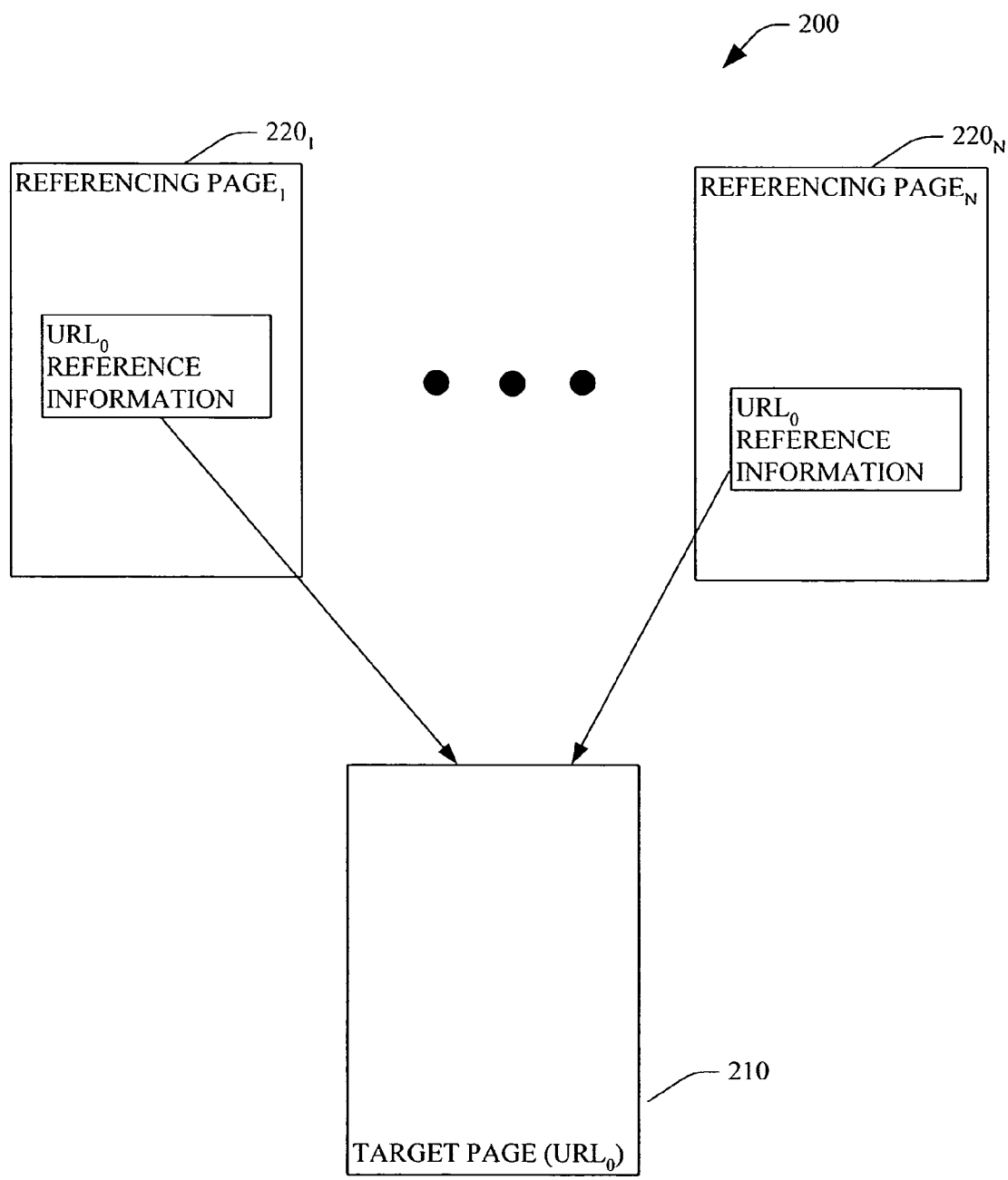
FIG. 2 is a diagram illustrating the relationship of a target page and referencing page(s) in accordance with an aspect of the present invention.

Turning briefly to FIG. 2, a diagram 200 illustrating the relationship of a target page 210 and referencing page(s) 220 in accordance with an aspect of the present invention is provided. The target page 210 (e.g., uniquely identified by a uniform resource locator (URL)), for example, $URL_0$, can be referred to by zero, one or a plurality of referencing page(s) 220. Referencing page(s) 220 includes a reference (e.g., hyperlink) to the target page 210 (e.g., $URL_0$). Additionally, the referencing page(s) 220 can further include reference information (e.g., anchor text) associated with the reference (e.g., hyperlink) to the target page 210. The reference information can include descriptive information associated with the target page 210 that can be useful, for example, in indexing the target page 210.

Referring back to FIG. 1, the system 100 can accumulate reference information (e.g., anchor text) associated with a particular page in the page data store 110 (e.g., URL seen file). When a request for a page is received, the crawler component 120 can fetch the page (e.g., via the Internet). Thereafter, the crawler component 120 can retrieve reference information (e.g., anchor text) associated with the page, if any, from the page data store 110. The crawler component 120 can then merge the page and at least some of its associated reference information (e.g., anchor text), if any, and provide the merged page and associated reference information (e.g., to an index builder (not shown)).

The system 100 can facilitate an efficient search engine that indexes not only the words contained within an Internet page (e.g., document), but also reference information (e.g., anchor text) of links in other pages (e.g., documents) that point to the page (e.g., document). Thus, in accordance with an aspect of the present invention, reference information (e.g., anchor text) found in link(s) to a page (e.g., document) can be included in the index of words associated with the page (e.g., document) with minimal machine cost. Reference information (e.g., anchor text) of link(s) pointing to a page (e.g., document) is merged with the page (e.g., document) at download time, making it easy to include reference information (e.g., anchor text words) in the index for the page (e.g., document).

In one example, the system 100 maintains a multi-gigabyte store of data on the URLs it has seen in the page data store 110. When links are parsed from documents, the associated anchor text is extracted by the crawler component 120 and stored in the page data store 110 along with the target URL and/or a hash (e.g., 80-bit CRC hash) of the target URL. The system 100 retains anchor text within the persistent page data store 110, collecting together substantially all the anchor text used in web links to a URL. When a URL is selected for download, the anchor text associated with the URL is extracted from the page data store 110 and included in the download request. When the download is complete (or fails or for some reason cannot be performed), the system 100 merges the anchor text with the downloaded bytes (if any) in a single transmission to the indexing process.

In one example, the download is retried (e.g., several times) over a period of time (e.g., up to about 24 hours). If the download has still not been successful at that point, the URL is placed in a state that will result in it being removed from the system after another time interval (e.g., on the order of 24-48 hours). This will remove dead URLs from the system, while allowing URLs that actually still exist (but were simply inaccessible for 24 hours) to re-enter the system as newly found URLs after they are fully purged from the URL seen file (e.g., 24-48 hours after attempts to download the URL were suspended). Therefore, in this example, while the system 100 permits associated anchor text and metadata to be passed to an index building component in the download failure case, this functionality is not used.

The system 100 can be employed as part of an incremental web crawling system. The first time a page (e.g., document) is crawled a minimal, if any, amount of reference information (e.g., anchor text) will have been accumulated in the page data store 110. However, as additional pages are crawled, increasingly larger amounts of anchor text are accumulated in the page data store 110. Thus, when a page is re-crawled, a larger amount of reference information (e.g., anchor text) can be available and merged with the re-crawled page. For example, substantially all of the reference information can be merged with the re-crawled page. Alternatively, only reference information added since a previous crawl can be merged with a portion (e.g., incrementally different) of the re-crawled page.

In one example, in order to reduce random disk seeks, URLs to be retrieved are buffered in a sorted list in memory. As URLs are visited, a new file is written sequentially with reference information (e.g., anchor text) to increase disk efficiency.

In another example, reference information stored in the page data store 110 has a life-time (e.g., two weeks). Once the life-time has expired, the reference information is no longer used (e.g., ignored and/or deleted).

It is to be appreciated that the system 100, the page data store 110 and/or the crawler component 120 can be computer components as that term is defined herein.

Figure 3:
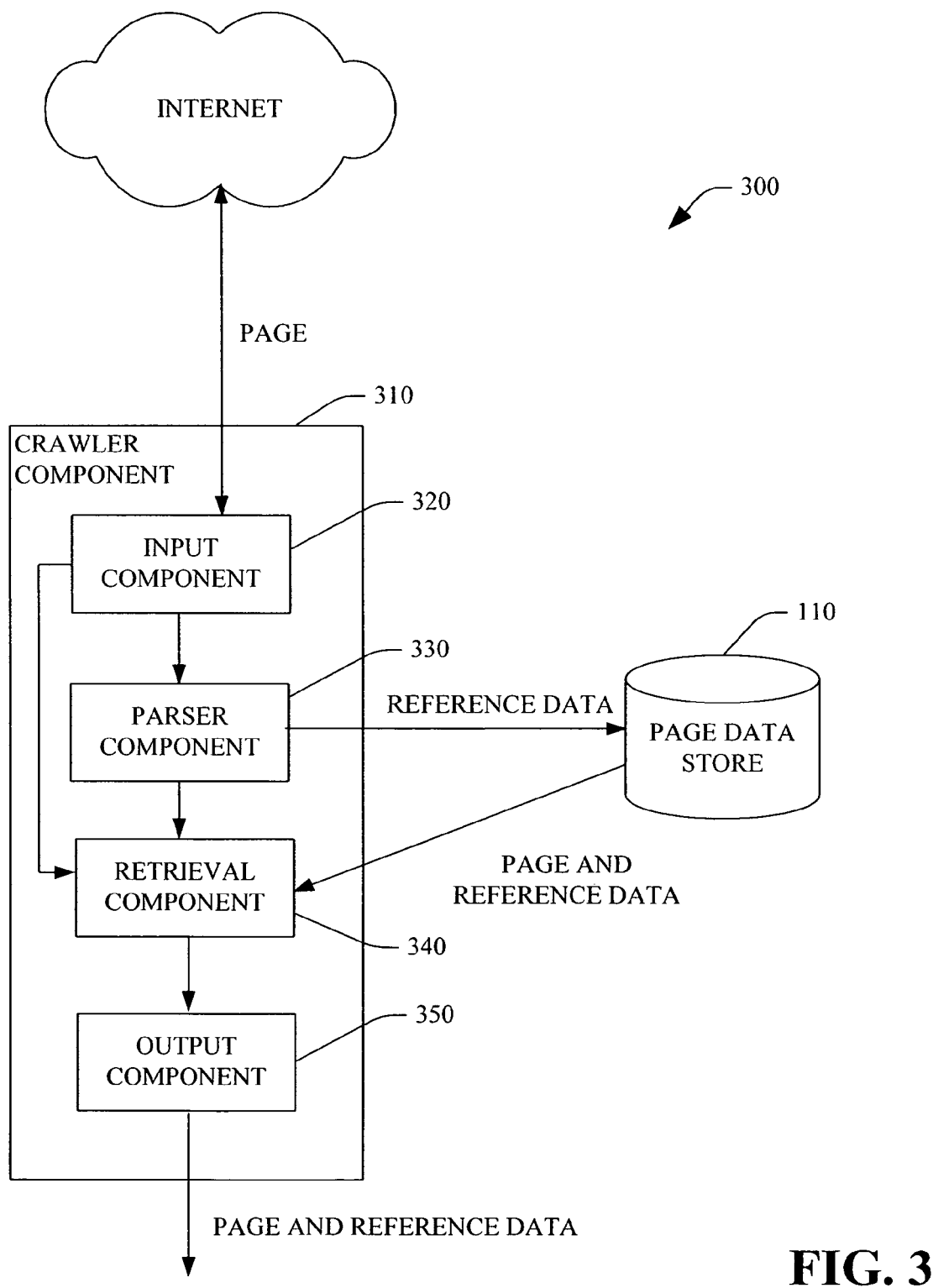
FIG. 3 is a block diagram of a page index system in accordance with an aspect of the present invention.

Next, referring to FIG. 3, a page index system 300 in accordance with an aspect of the present invention is illustrated. The page index system 300 includes a page data store 110 and a crawler component 310. The crawler component 310 includes an input component 320, a parser component 330, a retrieval component 340 and an output component 350.

The input component 320 receives a page (e.g., document) from, for example, the Internet, and provides the page to the parser component 330. The parser component 330 parses the page for URL(s) referenced on the page. The parser component 330 stores the URL(s) in the page data store 110 along with associated reference information (e.g., anchor text), if any. In one example, the page includes five URLs. The parser component 330 identifies the five URLs and associated reference information (e.g., anchor text). The parser component 330 then stores each of the five URLs and the reference information associated with the particular URL.

The reference information can include anchor text associated with the referencing URL. In another example, the reference information includes a sentence fragment, a sentence and/or a paragraph in proximity to the referencing URL.

The retrieval component 340 receives the page from the parser component 330 and/or the input component 320. The retrieval component 340 further retrieves reference information (e.g., anchor text) associated with the page, if any. The retrieval component 340 provides the reference information associated with the page and the page to the output component 350 which merges the page and associated reference information and provides the merged page and associated reference information as an output (e.g., to an index builder).

In one example, the page data store 110 is physically remote from the crawler component 310. In another example, the page data store 110 is a part of the crawler component 310.

It is to be appreciated that the system 300, the crawler component 310, the input component 320, the parser component 330, the retrieval component 340 and/or the output component 350 can be computer components as that term is defined herein.

Figure 4:
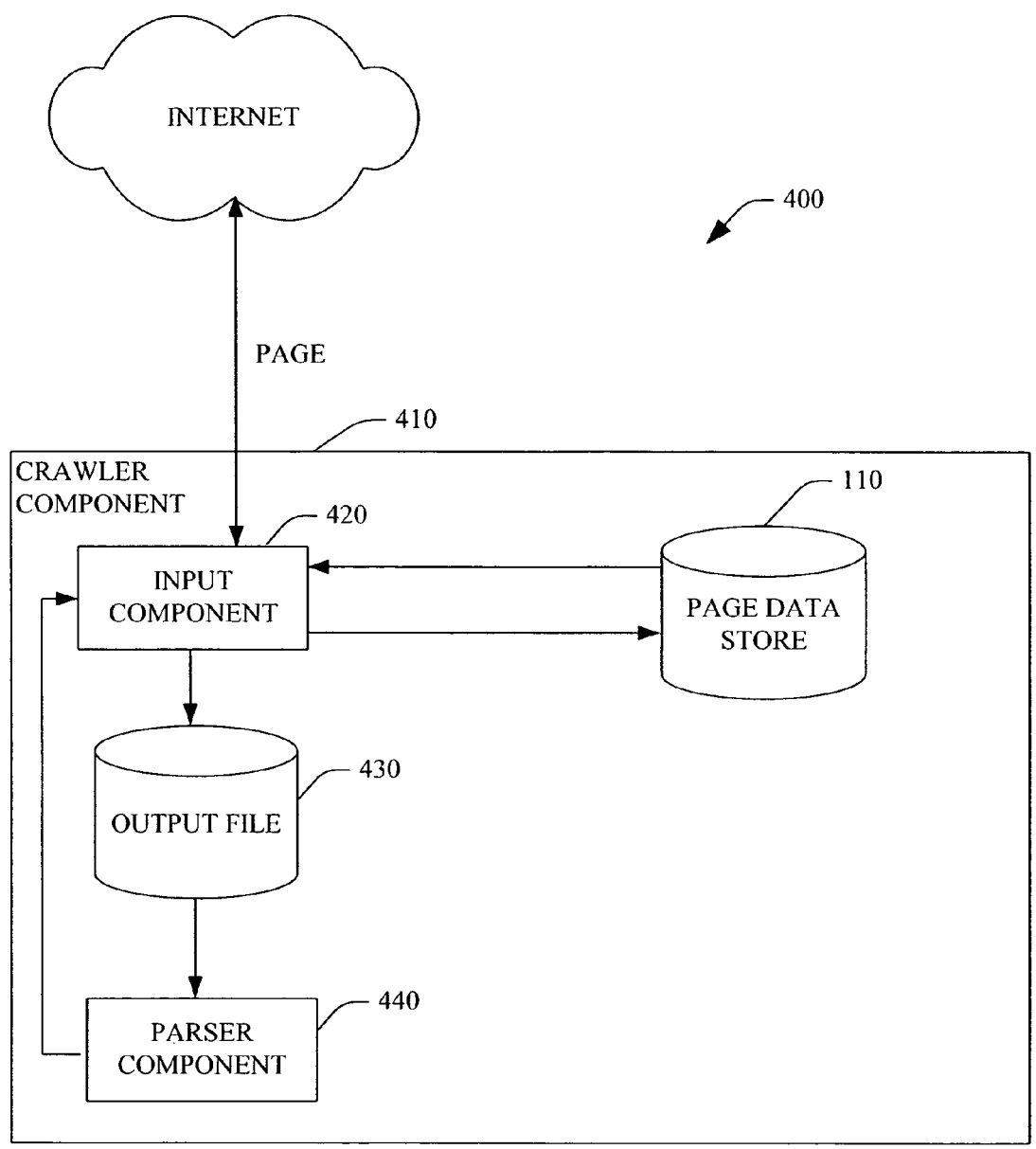
FIG. 4 is a block diagram of a page index system in accordance with an aspect of the present invention.

Referring to FIG. 4, a page index system 400 in accordance with an aspect of the present invention is illustrated. The page index system 400 includes a page data store 110 and a crawler component 410. The crawler component 410 includes an input component 420, output file 430 and a parser component 440.

In this example, the input component 420 retrieves anchor text (e.g., and other associated metadata) from the page data store 110 prior to downloading the document from the Internet. Upon successful completion of the download, the previously retrieved metadata is placed into an output file 430 along with the downloaded document. When an output file 430 contains a given number of documents, it is passed to the parser component 440. The parser component 440 extracts links and their anchor text from the downloaded documents and writes the extracted data to a file that is passed back to the input component 420 of the crawler component 410. The input component 420 is responsible for merging the newly received data (e.g., URLs, anchor text, and other metadata) into the page data store 110 (e.g., URL seen file).

It is to be appreciated that the system 500, the crawler component 510, the input component 520, the output file 530 and/or the parser component 540 can be computer components as that term is defined herein.

Figure 5:
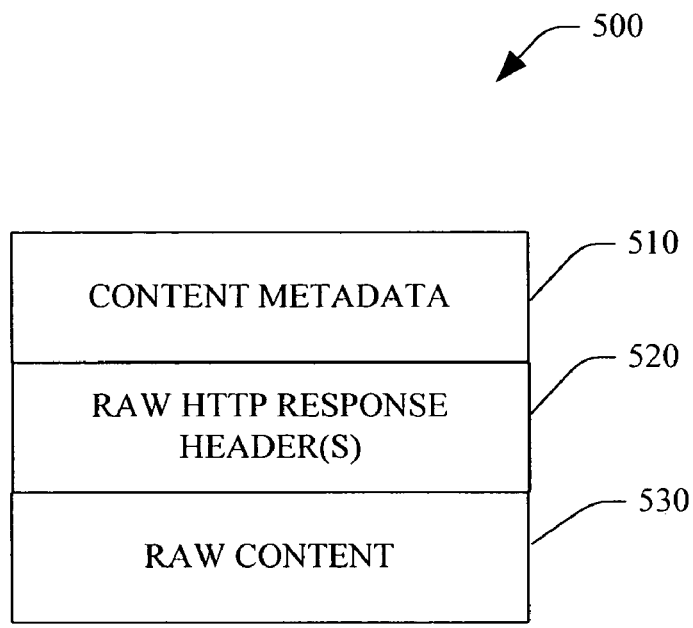
FIG. 5 is a diagram of an exemplary data structure in accordance with an aspect of the present invention.

Turning to FIG. 5, an exemplary data structure 500 in accordance with an aspect of the present invention is illustrated. The exemplary data structure 500 can be provided as an output by the crawler component 120 and/or the crawler component 310. The exemplary data structure 500 includes a content metadata section 510, a raw HTTP response header(s) section 520, and, a raw content section 530.

The content metadata section 510 can include data that is not intrinsic to the page when it is received. In one example, at least some of the following data can be included in the content metadata section 510:

TABLE 1

| Field Name | Description, Purpose and Syntax |
| --- | --- |
| Document-URL | This is the URL of the initial site to which the request was made. If the request is not redirected this will be where the document is received. |
| Redirected-To-URL | Stores the URL to which the request was redirected. For redirects this is where the content came from. If there is no redirect this will be blank. |
| IP-Address | This is the IP Address of the initial site that was initially requested (e.g., stored in IPv6 Format). |
| Redirected-To-IP-Address | For redirects, this is the IP Address to which the crawler was redirected (e.g., stored in Ipv6 format). |
| Original-HTTP-Response-Status | Used for redirects and tracks the original HTTP Response Status Code that was sent to the crawler. This is used by the Index Builder to determine whether the redirect should be treated as a link or not. |
| IP-Addresses-Traversed | Records IP Address(es) that were traversed by the crawler when it was redirected. This can be used for spam detection (e.g., stored in IPv6 format). |
| Link-Depth | Counts down the remaining depth available to crawl. For example, initial depth can be assigned based on rank of parent. |
| Download-Time | FILETIME (High 32 bits) |
| Download-Duration | FILETIME (Low 32 bits) |
| Rank | Stores the rank of the document |
| Document-Change-Info | Date of visit, change information and/or confidence information |
| Document-Key | Document Shingleprint. |
| Previous-Document-Key | Previous Document Shingleprint |
| Truncation | Value is 0 if it is not truncated and 1 if it is truncated. |
| Category-Info | The category(ies) to which the page belongs. |
| Previous-Category-Info | Stores the previous categories of a page |
| Language | The language of the page (e.g., ISO-639 2 Letter language codes). |
| Market | The location/market of the page (e.g., ISO 3166-1 Locale identifiers). |
| Character-Set | Stores the character set. |
| Link-Instance-Data | There can be multiple occurrences of the link instance data element. It represents metadata about pages that point to this document. |

The Link-Instance-Data element encapsulates details regarding a single page that links to the current source. The Link-Instance-Data element can capture, for example, the following information:

Version
Chunk
Category
URL
Rank
Language
Anchor Text

Figure 6:
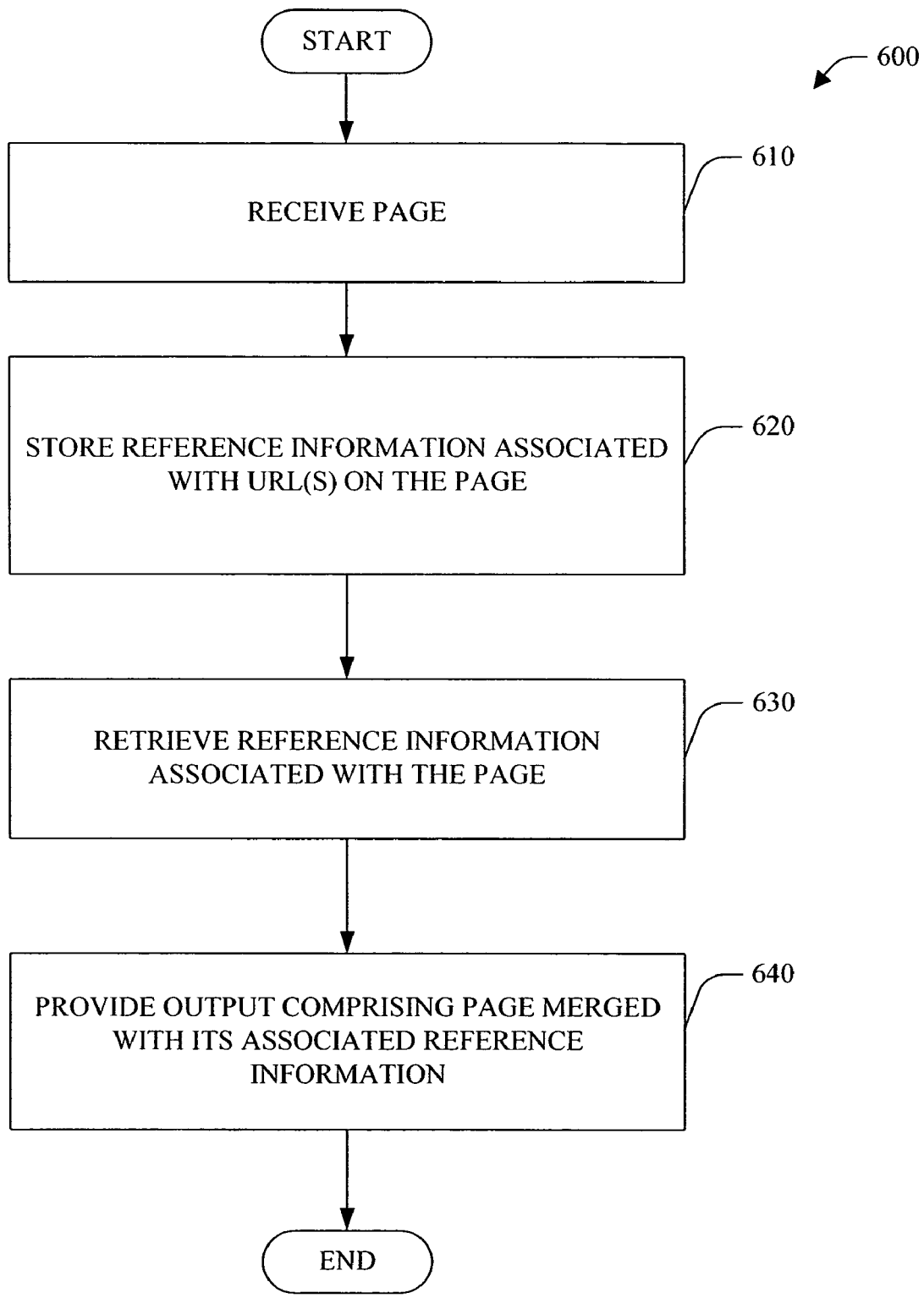
FIG. 6 is a flow chart of a method facilitating page indexing in accordance with an aspect of the present invention.
Figure 7:
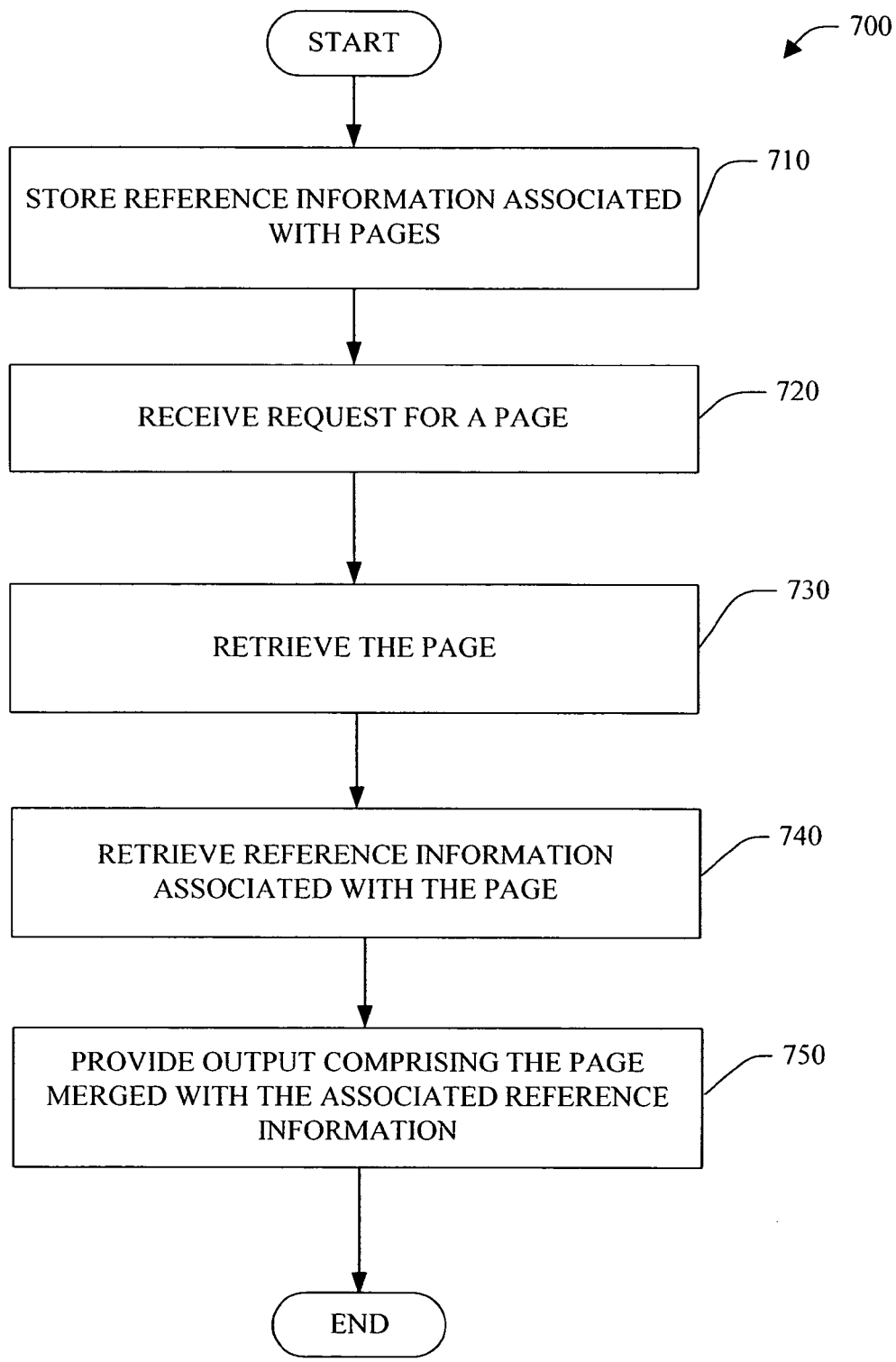
FIG. 7 is a flow chart of a method facilitating page indexing in accordance with an aspect of the present invention.

Turning briefly to FIGS. 6 and 7, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 6, a method facilitating page indexing 600 in accordance with an aspect of the present invention is illustrated. At 610, a page (e.g., document) is received, for example, from the Internet. At 620, reference information (e.g., anchor text) associated with URL(s) on the page is stored. For example, the reference information can be stored along with the particular URL in the page data store 110.

Next, at 630, reference information associated with the page (e.g., document) is retrieved (e.g., from the page data store 110). At 640, the page and its associated reference information, if any, is merged into an output. For example, the output can be employed by an indexing system of a search engine.

Next, turning to FIG. 7, a method facilitating page indexing 700 in accordance with an aspect of the present invention is illustrated. At 710, reference information (e.g., anchor text) associated with pages is stored. For example, the reference information can include anchor text. The reference information can be stored along with a URL identifying the page to which the reference information refers.

At 720, a request for a page is received (e.g., from an incremental web crawler). At 730, the page is retrieved (e.g., from the Internet). At 740, reference information (e.g., anchor text) associated with the page (e.g., based on the URL identifying the page) is retrieved. For example, the reference information can be retrieved from a page data store 110. At 750, the page and associated reference information, if any, are merged and provided as an output, for example, to an indexing system.

Figure 8:
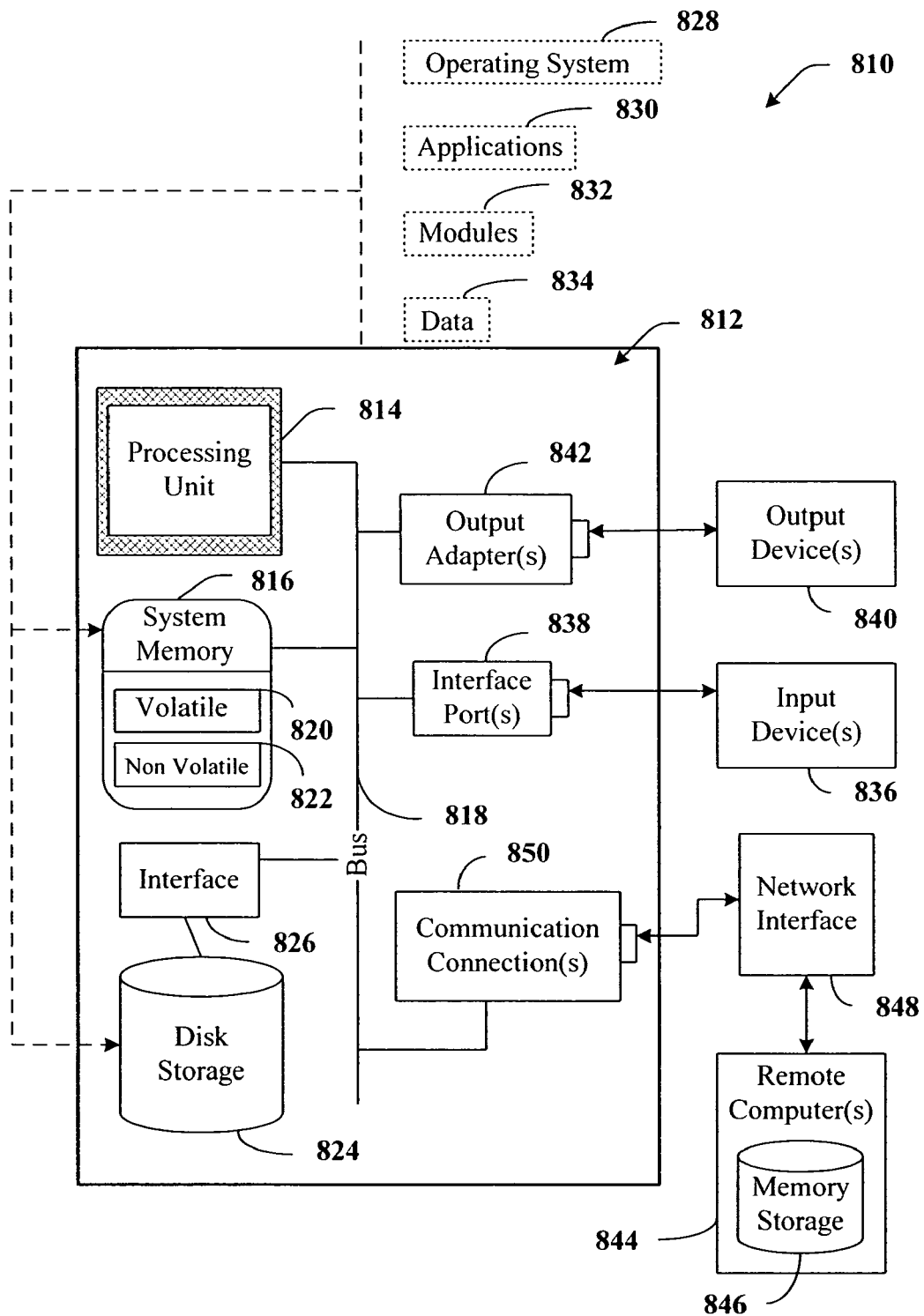
FIG. 8 illustrates an example operating environment in which the present invention may function.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. Computer-readable instructions embodied on a computer-readable storage medium that when executed on one or more processors implement a page index system, the system comprising:
   a page data store that stores reference information associated with a page, the reference information is obtained from at least one other page and is accumulated incrementally from each other page as each other page is crawled, the reference information comprising descriptive information that is adjacent to anchor text associated with a referencing uniform resource locator that references the page; and
   a crawler component that receives the page, retrieves the reference information associated with the page from the page data store, and provides the page and the reference information to at least an index building component; wherein failure to receive a requested page after a first predetermined period of time causes the URL for the page to be removed from the page data store after a second predetermined period of time.

2. A web crawler employing the system of claim 1.

3. The system of claim 1, the reference information further comprising anchor text.

4. The system of claim 1, the reference information comprising at least one of a sentence fragment, a sentence or a paragraph, or a combination thereof, adjacent to the anchor text.

5. An Internet search engine employing the page and the reference information provided by the system of claim 1.

6. The system of claim 1, the page data store stores a uniform resource locator that identifies the page, the uniform resource locator further employed to identify the reference information associated with the page.

7. A crawler embodied on a computer-readable storage medium comprising:
   an input component that receives one or more pages;
   a parser component that parses the one or more pages for another page referenced on the one or more pages, and accumulatively stores reference information associated with the another page in a page data store, the reference information comprising descriptive information that is in proximity to anchor text associated with a referencing uniform resource locator that references the another page, wherein failure to receive the one or more page after a first predetermined period of time causes the URL for the page to be removed from the page data store after a second period of time;
   a retrieval component that receives the another page and retrieves the reference information associated with the another page from the page data store; and
   an output component that provides an output, comprising the another page merged with the reference information associated with the another page, to an index building system.

8. A page indexing system comprising the crawler of claim 7.

9. The page indexing system of claim 8 further comprising the page data store.

10. The system of claim 7, the page data store stores a uniform resource locator that identifies a particular page, the uniform resource locator further employed to identify the reference information associated with the particular page.

11. The crawler of claim 7, the reference information further comprising anchor text.

12. The crawler of claim 7, the reference information comprising at least one of a sentence fragment, a sentence or a paragraph, or a combination thereof, in proximity to the anchor text.

13. A computer implemented method facilitating page indexing comprising:
   retrieving reference information associated with a page from at least one other page, the reference information comprising descriptive information that is in proximity to anchor text associated with a referencing uniform resource locator that references the page;
   storing the reference information associated with the page in a data store;
   incrementally accumulating the reference information from each other page as each other page is crawled;
   merging the page with the reference information;
   providing an output comprising the page merged with the reference information associated with the page to at least an index building system; and
   deleting the information for a page from the data store when the page cannot be retrieved for a predetermined period of time.

14. The method of claim 13, further comprising at least one of the following:
   receiving a request for retrieving the page;
   retrieving the page; or
   storing reference information associated with a uniform resource locator on the page.

15. The method of claim 13, retrieval of the reference information associated with the page being based, at least in part, upon a uniform resource locator identifying the page.

16. One or more computer readable storage media having stored thereon computer executable instructions for carrying out the method of claim 13.

17. One or more computer readable storage media storing computer executable components of a crawler comprising:
   an input component that receives one or more pages;
   a parser component that parses the one or more pages for another page referenced on the one or more pages, incrementally accumulates reference information associated with the another page from each of the one or more pages when crawled, and stores such reference information in a page data store, the reference information comprising descriptive information that is in proximity to anchor text associated with a referencing uniform resource locator that references the another page, wherein failure to receive the one or more pages after a first predetermined period of time causes the URL for the one or more pages to be removed from the page data store after a second period of time;
   a retrieval component that receives the another page and retrieves the reference information associated with the another page from the page data store; and
   an output component that provides an output, comprising the another page merged with the reference information associated with the another page, to at least an index building system.

18. The storage media of claim 17, the page data store storing a uniform resource locator that identifies the another page, the uniform resource locator further being employed to identify the reference information associated with the another page.

19. The storage media of claim 17, the reference information further comprising anchor text.

20. The storage media of claim 17, the reference information comprising at least one of a sentence fragment, a sentence or a paragraph, or a combination thereof, in proximity to the anchor text.

21. A page index system embodied on a computer-readable storage medium, comprising:
- means for retrieving reference information associated with a page from at least one other page;
- means for incrementally accumulating the reference information from each other page as each other page is crawled;
- means for storing the reference information in a data store, the reference information comprising descriptive information that is adjacent to anchor text associated with a uniform referencing locator that references the page;
- means for receiving the page;
- means for retrieving the reference information associated with the page from means for storing the reference information;
- means for providing an output to at least an index building system, the output comprising the page merged with the reference information associated with the page; and
- means for removing the page from the data store when the page cannot be received after a predetermined period of time.

22. The system of claim 21, the means for storing the reference information further storing a uniform resource locator that identifies the page, the uniform resource locator further being employed to identify the reference information associated with the page.

23. The system of claim 21, the reference information further comprising anchor text.

24. The system of claim 21, the reference information comprising at least one of a sentence fragment, a sentence or a paragraph, or a combination thereof, adjacent to a referencing uniform resource locator.

* * * * *